(12) United States Patent
Bischof

(10) Patent No.: US 12,021,251 B2
(45) Date of Patent: Jun. 25, 2024

(54) WATERPROOF EXTERNAL POWER SOURCE FOR PORTABLE REFRIGERATOR

(71) Applicant: LEISURE-TEC INTERNATIONAL LIMITED, Des Voeux Road Central (HK)

(72) Inventor: Andreas Bischof, Des Voeux Road Central (HK)

(73) Assignee: LEISURE-TEC INTERNATIONAL LIMITED, Des Voeux Road Central (HK)

( * ) Notice: Subject to any disclaimer, the term of this patent is extended or adjusted under 35 U.S.C. 154(b) by 755 days.

(21) Appl. No.: 17/275,366

(22) PCT Filed: Apr. 25, 2019

(86) PCT No.: PCT/CN2019/084255
§ 371 (c)(1),
(2) Date: Mar. 11, 2021

(87) PCT Pub. No.: WO2020/057126
PCT Pub. Date: Mar. 26, 2020

(65) Prior Publication Data
US 2022/0059899 A1    Feb. 24, 2022

(30) Foreign Application Priority Data

Sep. 21, 2018   (CN) .......................... 201821554546.1

(51) Int. Cl.
*H01M 50/247* (2021.01)
*H01F 7/02* (2006.01)
*H01M 50/213* (2021.01)

(52) U.S. Cl.
CPC ............ *H01M 50/247* (2021.01); *H01F 7/02* (2013.01); *H01M 50/213* (2021.01); *H01M 2220/30* (2013.01)

(58) Field of Classification Search
CPC .............................. H01M 50/247; H01F 7/02
See application file for complete search history.

(56) References Cited

U.S. PATENT DOCUMENTS

| 10,618,692 B2 | 4/2020 | Hori | |
|---|---|---|---|
| 2015/0221901 A1* | 8/2015 | Cho | H01M 50/105 |
| | | | 429/7 |

(Continued)

FOREIGN PATENT DOCUMENTS

| CN | 203434658 U | 2/2014 |
|---|---|---|
| CN | 204792967 U | 11/2015 |

(Continued)

*Primary Examiner* — Karie O'Neill Apicella
(74) *Attorney, Agent, or Firm* — McNees Wallace & Nurick LLC

(57) ABSTRACT

The present utility model relates to a waterproof external power source for a portable refrigerator, comprising: a casing; a battery pack installed in the casing; a battery-pack-fixing and current-outputting device; and a power source installation device for fixing a power source to the outside of the portable refrigerator, the power source installation device being a mechanical installation frame or a magnetic installation device. The external power source is provided with a mechanical installation frame or a magnetic installation device, such that the external power source can be installed at a side portion of the portable refrigerator, thereby facilitating the connection between the portable refrigerator and the power source and the uses thereof, preventing the external power source from being placed in a disorderly manner, and achieving easy installation and simple disassembly.

9 Claims, 2 Drawing Sheets

(56) References Cited

U.S. PATENT DOCUMENTS

| | | | |
|---|---|---|---|
| 2016/0056432 A1* | 2/2016 | Searles | H01M 10/4257 |
| | | | 429/100 |
| 2017/0229692 A1* | 8/2017 | Thiel | H01M 50/271 |
| 2017/0259956 A1 | 9/2017 | Hori | |
| 2018/0069358 A1 | 3/2018 | Miller et al. | |
| 2018/0219396 A1 | 8/2018 | Lebovitz | |

FOREIGN PATENT DOCUMENTS

| | | | | |
|---|---|---|---|---|
| CN | 205901357 U | | 1/2017 | |
| CN | 206163538 U | | 5/2017 | |
| CN | 206313502 U | | 7/2017 | |
| CN | 206313502 U | * | 7/2017 | H02J 7/00 |
| CN | 206387178 U | | 8/2017 | |
| CN | 206387178 U | * | 8/2017 | F25D 23/10 |
| CN | 107176363 A | | 9/2017 | |
| CN | 207098700 U | | 3/2018 | |
| CN | 207218313 U | | 4/2018 | |
| CN | 207542839 U | | 6/2018 | |
| CN | 207573031 U | | 7/2018 | |
| JP | 5159038 B2 | | 3/2013 | |
| JP | 2014116238 A | | 6/2014 | |
| KR | 20080112622 A | | 12/2008 | |
| WO | 2016021090 A1 | | 2/2016 | |
| WO | 2018074355 A1 | | 4/2018 | |

* cited by examiner

WATERPROOF EXTERNAL POWER SOURCE FOR PORTABLE REFRIGERATOR

TECHNICAL FIELD

This utility model relates to the technical field of portable refrigerator accessories, and in particular to a waterproof external power source for a portable refrigerator.

BACKGROUND TECHNOLOGY

Portable refrigerators are refrigerators which are usable with mobility. For a common vehicle-mounted refrigerator, the power plug of the refrigerator is inserted into the vehicle's cigarette lighter to provide power to the portable refrigerator. In some occasions, portable refrigerators have independent power sources. However, the external power source of portable refrigerator cannot be integrated with the portable refrigerator body into one, which is inconvenient for use.

SUMMARY OF THE INVENTION

Technical Issue

The technical issue to be addressed by this utility model is to provide a waterproof external power source for a portable refrigerator, which can be installed at a side portion of the portable refrigerator and facilitate the connection and use of the portable refrigerator and the power source.

Solution to the Issue

Technical Solution

The technical solution of this utility model is that, this utility model provides a waterproof external power source for a portable refrigerator, the waterproof external power source includes a casing, a battery pack installed in the casing, a battery-pack-fixing and current-outputting device, and a power source installation device for fixing a power source to the outside of the portable refrigerator, where the power source installation device is a mechanical installation frame or a magnetic installation device.

Further, the battery-pack-fixing and current-outputting device includes a bracket, a control circuit board installed at a second end of the bracket, a display light board, an input socket, an output socket, a bracket fastener installed at a first end of the bracket, and a heat-dissipation aluminum plate arranged at the bottom of the bracket;

the inside of the bracket is hollow, and the battery pack is arranged in the bracket; two ends of an inner wall of the casing are respectively provided with protruding first and second stop bars, and the outline of the first end of the bracket is larger than the first stop bar and is smaller than the second stop bar, the outline of the second end of the bracket is larger than the second stop bar, the first end of the bracket is inserted into the casing from the end where the second stop bar is located and then is slid to the other end to abut against the inner wall of the first stop bar, and the second end of the bracket abuts against an outer wall of the second stop bar; and the outline of the bracket fastener is larger than the first stop bar, so that the bracket fastener abuts against the outside of the first stop bar, the bracket fastener is bolted to the first end of the bracket, so that two ends of the bracket are fixed in the casing and cannot move.

Further, the second end of the bracket and the outer peripheral surface of the bracket fastener are both provided with a sealing ring.

Further, the waterproof external power source further includes a waterproof label sticker pasted on the outside of the second end of the bracket and a waterproof back sticker pasted on the outside of the bracket fastener.

Further, in a case that the power source installation device is a magnetic installation device, the power source installation device includes magnet installation frames and magnets;

each of the magnet installation frames includes a support portion and a magnet groove, the magnet is fixed in the magnet groove, and a hole is provided at the bottom of the casing; and, a lower portion of the support portion is glued and fixed to the inside of the bottom of the casing by sealant, and the magnet groove passes through the hole.

Further, the magnet installation frame is made of plastic, and the outer surface of the bottom of the magnet groove is pasted with a silicone film.

Further, the hole and the magnet groove have the same shape and size.

Further, the magnet installation frames are symmetrically distributed on the bottom of the casing.

Further, in a case that the power source installation device is a mechanical installation frame, the power source installation device includes a fixing frame, and two ends of the fixing frame are provided with installation feet with screw holes.

Further, the casing is made of aluminum alloy or plastic, and the bracket is made of plastic.

Beneficial Effects of the Invention

Beneficial Effects

Implementing the waterproof external power source for the portable refrigerator of this utility model has the following beneficial effects: by arranging the mechanical installation frame or the magnetic installation device on the external power source, the external power source can be installed at a side portion of the portable refrigerator, which facilitates the connection and use of the portable refrigerator and the power source, avoids the external power source from being placed in a disorderly manner, and achieves easy installation and simple disassembly.

BRIEF DESCRIPTION OF THE DRAWINGS

Description of the Drawings

Figure 1:
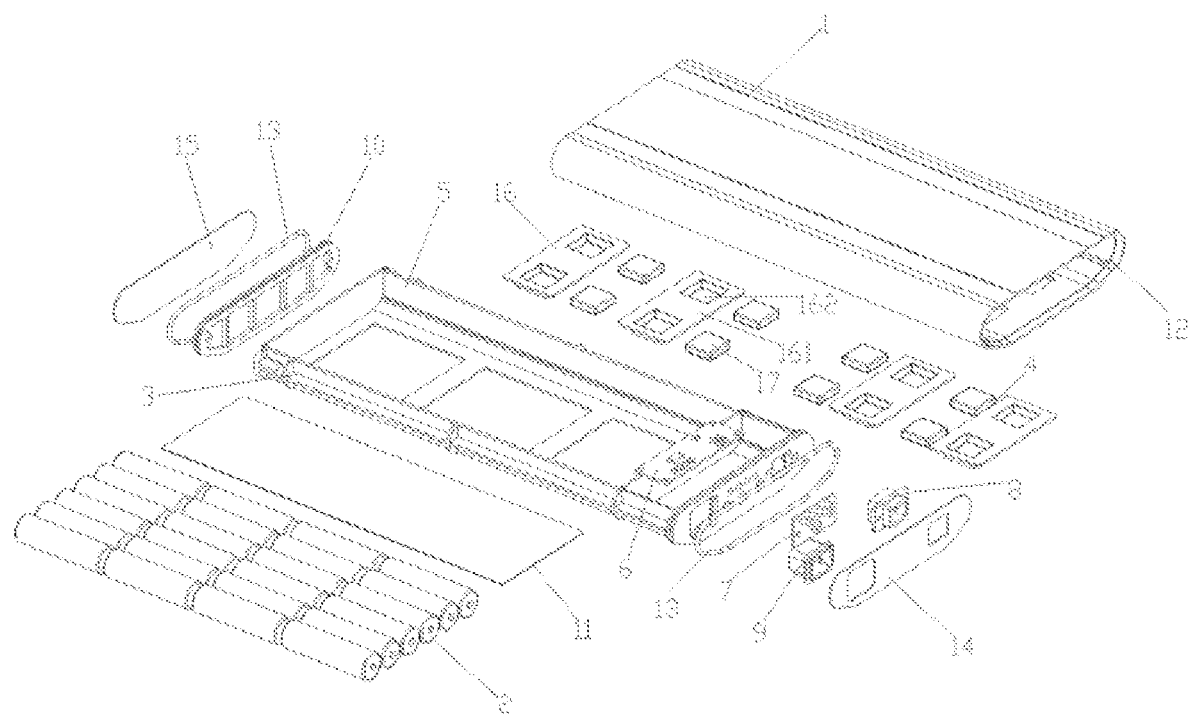
Figure 2:
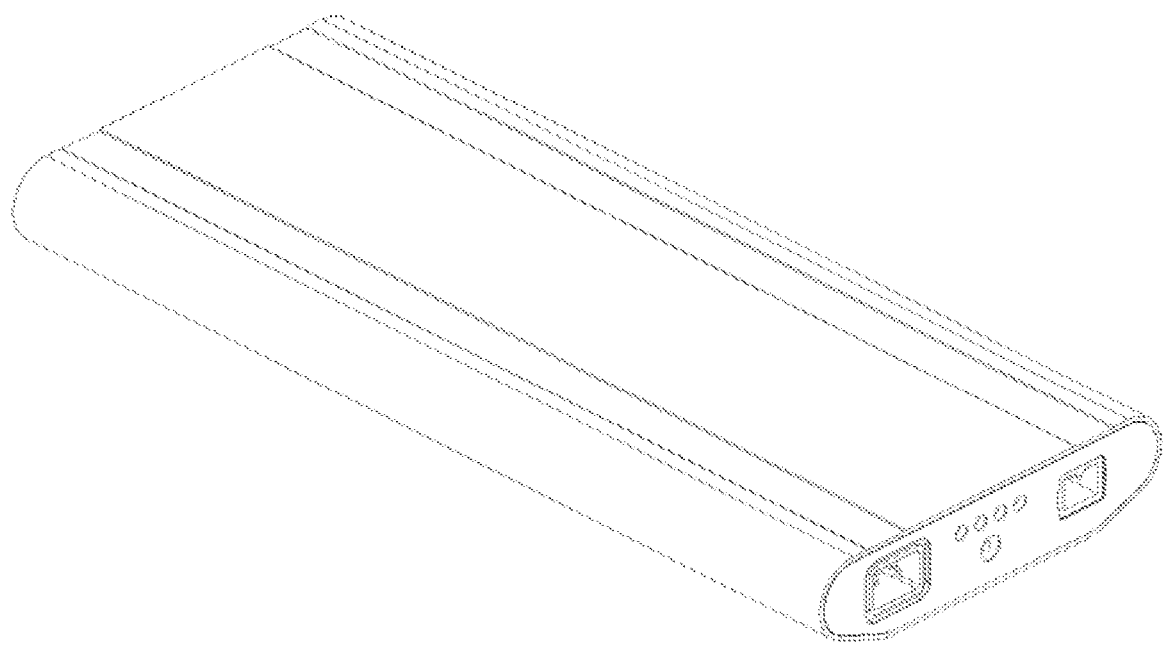
Figure 3:
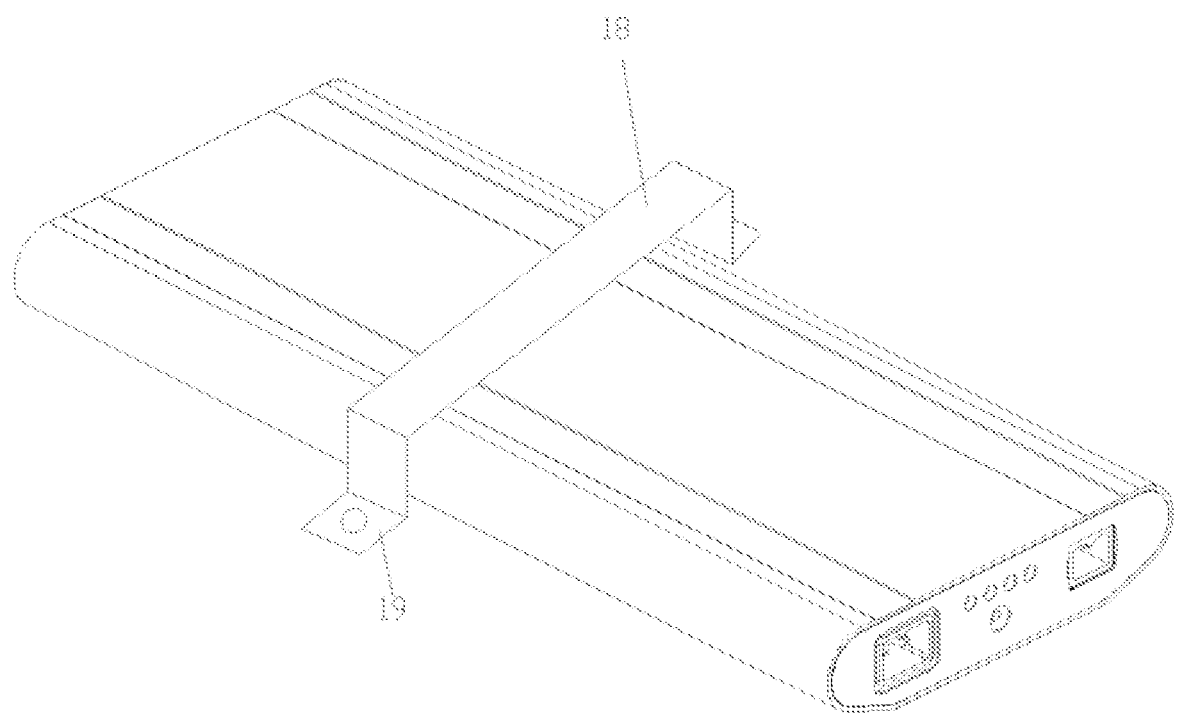
Figure 4:
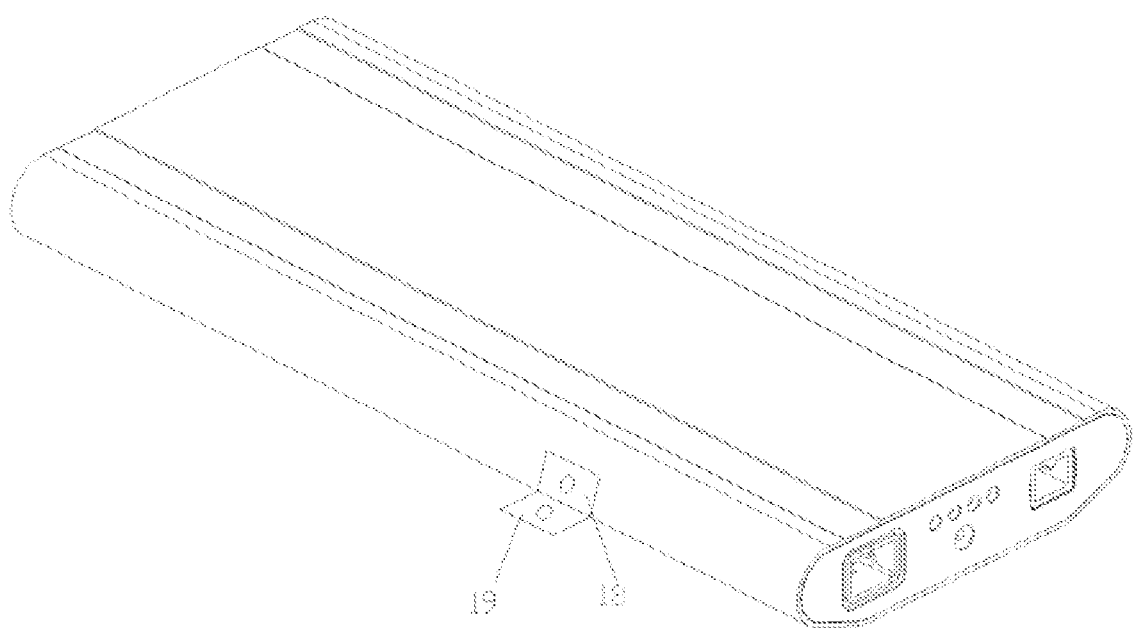

This utility model is further described below in conjunction with the accompanying drawings and embodiments. In the accompanying drawings:

FIG. 1 is a schematic exploded view of a first embodiment of a waterproof external power source for a portable refrigerator according to this utility model;

FIG. 2 is a schematic assembly view of the first embodiment of the waterproof external power source for the portable refrigerator according to this utility model;

FIG. 3 is a schematic structural view of a second embodiment of the waterproof external power source for the portable refrigerator according to this utility model; and FIG. 4 is a schematic structural view of a third embodiment of the waterproof external power source for the portable refrigerator according to this utility model.

BEST EMBODIMENT FOR IMPLEMENTING THE INVENTION

Best Embodiment of the Invention

A waterproof external power source for a portable refrigerator of this utility model includes a casing 1, a battery pack 2 installed in the casing 1, a battery-pack-fixing and current-outputting device 3, and a power source installation device 4 for fixing a power source to the outside of the portable refrigerator, where the power source installation device 4 is a mechanical installation frame or a magnetic installation device. The casing 1 is configured to carry the battery pack 2, the battery pack 2 is a lithium battery pack to provide power for the portable refrigerator, and the battery-pack-fixing and current-outputting device 3 is configured to fix the battery pack 2 in the casing 1. In the prior art, the external power source of the portable refrigerator is not fixed to the portable refrigerator for use, which causes problems such as the external power source is scattered and inconvenient to store when used. The waterproof external power source is provided with the power source installation device 4 to integrate the power source and the portable refrigerator into a whole, which facilitates the connection between the portable refrigerator and the external power source. The power source installation device of this utility model is a mechanical installation frame or a magnetic connector, which will be described in detail below.

The battery-pack-fixing and current-outputting device 3 includes a bracket 5, a control circuit board 6 installed at a second end of the bracket 5, a display light board 7, an input socket 8, an output socket 9, a bracket fastener 10 installed at a first end of the bracket 5, and a heat-dissipation aluminum plate 11 arranged at the bottom of the bracket 5; the bracket is configured to place the battery pack 2, the control circuit board 6 is configured to control the on-off of the external power source, the display light board 7 is configured to indicate the on-off status, the input socket 8 and the output socket 9 are respectively used for the input and output of current, the bracket fastener 10 is configured to lock the bracket 5 in the casing 1, and the heat dissipation aluminum plate 11 is configured to conduct the heat generated by the battery pack 2 to the bottom of the casing 1 and then to the air.

The inside of the bracket 5 is hollow, and the battery pack 2 is arranged in the bracket 5; two ends of an inner wall of the casing 1 are respectively provided with a protruding first stop bar and a protruding second stop bar 12, and the outline of the first end of the bracket 5 is larger than the first stop bar and is smaller than the second stop bar 12, the outline of the second end of the bracket 5 is larger than the second stop bar 12, the first end of the bracket 5 is inserted into the casing 1 from the end where the second stop bar 12 is located and then is slid to the other end to abut against the inner wall of the first stop bar, and the second end of the bracket 5 abuts against an outer wall of the second stop bar 12; and the outline of the bracket fastener 10 is larger than the first stop bar, so that the bracket fastener 10 abuts against the outside of the first stop bar, the bracket fastener 10 is bolted to the first end of the bracket 5, so that two ends of the bracket 5 are fixed in the casing 1 and cannot move. In order to fix the bracket 5 in the casing 1 so that the bracket 5 cannot move or shake to avoid noise and hidden dangers of damage to the parts, two ends of the inner wall of the casing 1 are respectively provided with stop bars, and each of the stop bars is a circular boss protruding from the inner wall to abut against the bracket 5. The outline of the first end of the bracket 5 is small, and the second end has a protruding circular boss with a larger outline. The first end can be inserted into the casing 1 from the end where the second stop bar 12 is located, and then abut against the inner wall of the first stop bar. At this time, the second end abuts against the outer wall of the second stop bar 12. The bracket fastener 10 is provided on the outside of the first stop bar, which abuts against the first stop bar and is connected to the first end of the bracket 5 by bolts. So that the first end of the bracket 5 is fixed by the bracket fastener 10 through bolts, and the second end abuts against the outer wall of the second stop bar 12, and both ends are fixed and cannot be shaken.

In this embodiment, the second end of the bracket 5 and the outer peripheral surface of the bracket fastener 10 are both provided with a sealing ring 13 for sealing the two ends of the bracket 5 to achieve the purpose of sealing and waterproofing.

The waterproof external power source in this embodiment further includes a waterproof label sticker 14 pasted on the outside of the second end of the bracket 5 and a waterproof back sticker 15 pasted on the outside of the bracket fastener 10. The waterproof label sticker 14 covers and seals electrical components at the first end of the bracket 5, the second end of the bracket 5 is bolted to the bracket fastener 10, and the waterproof back sticker 15 covers the fixing bolts, which makes the overall appearance more beautiful and plays a waterproof role on two sides of the power source.

Embodiment 1

In this embodiment, the power source installation device 4 is a magnetic installation device, which including magnet installation frames 16 and magnets 17;

Each of the magnet installation frames 16 includes a support portion 161 and a magnet groove 162, the magnet 17 is fixed in the magnet groove 162, and a hole is provided at the bottom of the casing 1; and, a lower portion of the support portion 161 is glued and fixed to the inside of the bottom of the casing 1 by sealant, and the magnet groove 162 passes through the hole. The support portion 161 is a flat plate and extends downward out of the groove, that is, the magnet groove 162. The lower portion of the support portion 161 is fixed to the bottom of the casing 1 and is glued thereto with sealant for waterproofing. Since the casing of the portable refrigerator is made of metal, the external power source can be attached to a side portion of the portable refrigerator by providing magnets at the bottom.

In this embodiment, the magnet installation frame 16 is made of plastic. The outer surface of the bottom of the magnet groove 162 is pasted with a silicone film. The silicone film is adhered to the bottom of the magnet groove 162 with double-sided adhesive to prevent scratching the casing of the portable refrigerator and increase the frictional force, so that the external power source will not move when attached to the portable refrigerator.

In this embodiment, the hole and the magnet groove 162 have the same shape and size, and both are square, so that the hole is closely fitted with the magnet groove 162 to prevent water leakage from the bottom.

In this embodiment, the magnet installation frames 16 are symmetrically distributed at the bottom of the casing 1. In this embodiment, two sets of magnet installation frames 16 are provided on the left and right sides of the casing 1. Of course, other number of magnet installation frames may be provided as required, as long as the waterproof external power source can be stably fixed on the side wall of the portable refrigerator.

Embodiment 2

In this embodiment, the power source installation device 4 is a mechanical installation frame, which includes a fixing frame 18, and two ends of the fixing frame 18 are provided with installation feet 19 with screw holes. The fixing frame surrounds three sides of the external power source and fixes the external power source on the side wall of the portable refrigerator. In this embodiment, screw holes need to be pre-punched on the portable refrigerator to match with the screw holes of the installation feet 19.

Embodiment 3

The difference between this embodiment and the second embodiment is that the fixing frame 18 is an L-shaped fixing frame, one end of the fixing frame is connected to the side wall of the portable refrigerator, and the other end of the fixing frame is connected to the casing 1 of the external power source. In this embodiment, in addition to the requirement of pre-punching screw holes on the portable refrigerator, it is also required to provide screw holes on the casing 1, and multiple fixing frames 18 are required to stably fix the external power source on the side wall of the portable refrigerator.

In the above three embodiments, the casing 1 is made of aluminum alloy or plastic, and the bracket 5 is made of plastic, both of which are lighter materials and facilitate the fixation of the power source on the side wall of the portable refrigerator.

In the waterproof external power source for a portable refrigerator according to this utility model, the external power source can be installed at a side portion of the portable refrigerator by providing a mechanical installation frame or a magnetic installation device on the external power source, which facilitates the connection and use of the portable refrigerator and the power source, avoids the external power source from being placed in a disorderly manner, and achieves easy installation and simple disassembly.

The above content is only the preferred embodiment of this utility model. For those of ordinary skill in the art, various modifications can be made to the specific embodiments and the application scope according to the idea of this utility model. As long as these modifications do not depart from the concept of this utility model, they shall fall within the protection scope of this utility model.

The invention claimed is:

1. A waterproof external power source for a portable refrigerator, comprising:
a casing, a battery pack installed in the casing, a battery-pack-fixing and current-outputting device, and a power source installation device for fixing a power source to the outside of the portable refrigerator,
wherein the power source installation device is a magnetic installation device,
wherein the power source installation device includes magnet installation frames and magnets,
wherein each of the magnet installation frames includes a support portion and a magnet groove,
wherein the magnet is fixed in the magnet groove,
wherein a hole is provided at a bottom of the casing,
wherein a lower portion of the support portion is attached and fixed to an inside of the bottom of the casing by a sealant, and
wherein the magnet groove passes through the hole.

2. The waterproof external power source for the portable refrigerator according to claim 1, characterized in that, wherein the battery-pack-fixing and current-outputting device comprises a bracket, a control circuit board installed at a second end of the bracket, a display light board, an input socket, an output socket, a bracket fastener installed at a first end of the bracket, and a heat-dissipation aluminum plate arranged at the bottom of the bracket;
the inside of the bracket is hollow, and the battery pack is arranged in the bracket; two ends of an inner wall of the casing are respectively provided with a protruding first stop bar and a protruding second stop bar, and an outline of the first end of the bracket is larger than the first stop bar and is smaller than the second stop bar, the outline of the second end of the bracket is larger than the second stop bar, the first end of the bracket is inserted into the casing from the end where the second stop bar is located and then is slid to another end to abut against an inner wall of the first stop bar, and the second end of the bracket abuts against an outer wall of the second stop bar; and an outline of the bracket fastener is larger than the first stop bar, the bracket fastener abuts against the outside of the first stop bar and is bolted to the first end of the bracket, so that two ends of the bracket are fixed in the casing and are not movable.

3. The waterproof external power source for the portable refrigerator according to claim 2, wherein the second end of the bracket and an outer peripheral surface of the bracket fastener are both provided with a sealing ring.

4. The waterproof external power source for the portable refrigerator according to claim 3, wherein the waterproof external power source further comprises a waterproof label sticker pasted on the outside of the second end of the bracket and a waterproof back sticker pasted on the outside of the bracket fastener.

5. The waterproof external power source for the portable refrigerator according to claim 1, wherein the magnet installation frame is made of plastic, and an outer surface of the bottom of the magnet groove is pasted with a silicone film.

6. The waterproof external power source for the portable refrigerator according to claim 5, wherein the hole and the magnet groove have the same shape and size.

7. The waterproof external power source for the portable refrigerator according to claim 6, wherein the magnet installation frames are symmetrically distributed on the bottom of the casing.

8. The waterproof external power source for the portable refrigerator according to claim 4, characterized in that, wherein in a case that the power source installation device is a mechanical installation frame, the power source installation device comprises a fixing frame, and two ends of the fixing frame are provided with installation feet with screw holes.

9. The waterproof external power source for the portable refrigerator according to claim 2, wherein the casing is made of aluminum alloy or plastic, and the bracket is made of plastic.

* * * * *